US010996941B2

(12) United States Patent
Krishnaswamy et al.

(10) Patent No.: US 10,996,941 B2
(45) Date of Patent: *May 4, 2021

(54) ENABLING TENANT ADMINISTRATORS TO INITIATE REQUEST DRIVEN PEAK-HOUR BUILDS TO OVERRIDE OFF-PEAK PATCHING SCHEDULES

(71) Applicant: Microsoft Technology Licensing, LLC, Redmond, WA (US)

(72) Inventors: Chandramouleeswaran Krishnaswamy, Bellevue, WA (US); Rahul Nigam, Bothell, WA (US); Eladio Guzman, Redmond, WA (US); Mark Raymond Gilbert, Issaquah, WA (US); Jianfeng Cai, Redmond, WA (US); Mustafaraj M. Dhrolia, Redmond, WA (US); Peter Kenneth Harwood, Bellevue, WA (US); Esha Sharma, Redmond, WA (US); Jay Lu, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/596,652

(22) Filed: Oct. 8, 2019

(65) Prior Publication Data

US 2020/0042308 A1 Feb. 6, 2020

Related U.S. Application Data

(63) Continuation of application No. 15/940,835, filed on Mar. 29, 2018, now Pat. No. 10,585,659.

(51) Int. Cl.
*G06F 9/44* (2018.01)
*G06F 11/07* (2006.01)
(Continued)

(52) U.S. Cl.
CPC ............... *G06F 8/65* (2013.01); *H04L 43/16* (2013.01); *H04L 67/22* (2013.01); *G06F 8/658* (2018.02);
(Continued)

(58) Field of Classification Search
CPC ..... G06F 8/65; G06F 8/71; G06F 8/75; G06F 8/658; G06F 11/0709; G06F 11/0766;
(Continued)

(56) References Cited

U.S. PATENT DOCUMENTS 5,978,381 A * 11/1999 Perlman ................. H04L 29/06
370/432
6,721,713 B1 * 4/2004 Guheen ................. G06Q 50/01
705/1.1
(Continued)

OTHER PUBLICATIONS

Tak-Wah Lam et al., Performance guarantee for online deadline scheduling in the presence of overload, Jan. 7-9, 2001, [Retrieved on Jul. 4, 2019]. Retrieved from the internet: <URL: https://dl.acm.org/citation.cfm?id=365772> 10 Pages (755-764) (Year: 2001).*

(Continued)

*Primary Examiner* — Anibal Rivera
(74) *Attorney, Agent, or Firm* — Newport IP, LLC; Mike R. Cicero

(57) ABSTRACT

A system enables initiation of request driven peak-hour builds to override "off-peak" patching schedules for updating server applications. An "off-peak" patching schedule is generated to minimize disruption from installing builds of patches. Notwithstanding the "off-peak" patching schedule, a tenant administrator initiates request driven peak-hour builds when some performance failure occurs during peak business hours. For example, the tenant administrator may generate a service request that includes incident data that is usable to identify and/or develop a particular patch for resolving the performance failure. Based on the service request, the "off-peak" patching schedule is overridden to expedite an out-of-sequence installation of a particular patch. In this way, a tenant administrator that becomes aware that some performance failure is disrupting information workers during a peak usage time-range (e.g., business hours) is empowered to initiate a request driven peak-hour build to quickly resolve the performance failure during the peak usage time-range.

20 Claims, 6 Drawing Sheets

(51) Int. Cl.
*G06F 17/50* (2006.01)
*G06F 8/65* (2018.01)
*H04L 12/26* (2006.01)
*H04L 29/08* (2006.01)
*H04L 12/24* (2006.01)
*G06F 8/75* (2018.01)
*G06F 8/71* (2018.01)
*G06F 8/658* (2018.01)
*G06F 11/36* (2006.01)

(52) U.S. Cl.
CPC .............. *G06F 8/71* (2013.01); *G06F 8/75* (2013.01); *G06F 11/0709* (2013.01); *G06F 11/0766* (2013.01); *G06F 11/368* (2013.01); *H04L 41/065* (2013.01); *H04L 43/0817* (2013.01); *H04L 67/12* (2013.01); *H04L 67/34* (2013.01)

(58) Field of Classification Search
CPC .... G06F 11/368; G06F 11/0748; G06F 11/36; H04L 43/16; H04L 67/22; H04L 67/34; H04L 41/065; H04L 41/20; H04L 41/14; H04L 41/0816; H04L 43/0864; H04L 43/0817; H04L 67/1008; H04L 67/12; H04L 41/064; H04L 41/22; H04L 41/0843; H04L 41/082
See application file for complete search history.

(56) References Cited

U.S. PATENT DOCUMENTS

| | | | |
|---|---|---|---|
| 8,037,453 B1* | 10/2011 | Zawadzki | G06F 8/71 717/123 |
| 8,271,402 B2 | 9/2012 | Fisher, Jr. | |
| 8,271,966 B2 | 9/2012 | Bantz et al. | |
| 8,819,655 B1* | 8/2014 | Hopwood | G06F 8/658 717/168 |
| 8,819,658 B2 | 8/2014 | Balasubramanian | |
| 8,893,110 B2 | 11/2014 | Kapadekar et al. | |
| 8,997,086 B2 | 3/2015 | Deckert et al. | |
| 9,348,585 B2 | 5/2016 | Eliaš | |
| 9,582,408 B1 | 2/2017 | Jayaraman et al. | |
| 9,665,359 B2 | 5/2017 | Thomas et al. | |
| 9,984,111 B2 | 5/2018 | Fillipi et al. | |
| 10,217,067 B2 | 2/2019 | Cavalcante et al. | |
| 10,289,403 B1 | 5/2019 | Krishnaswamy et al. | |
| 10,374,930 B2 | 8/2019 | Cai et al. | |
| 2001/0055303 A1* | 12/2001 | Horton | H04L 41/12 370/389 |
| 2002/0161890 A1* | 10/2002 | Chen | H04L 67/02 709/226 |
| 2003/0126202 A1* | 7/2003 | Watt | H04L 67/1008 709/203 |
| 2006/0075306 A1* | 4/2006 | Chandrasekaran | G06F 11/3688 714/47.2 |
| 2007/0010983 A1* | 1/2007 | Bauer | G06Q 10/109 703/17 |
| 2007/0162514 A1* | 7/2007 | Civetta | G06F 16/22 |
| 2008/0098109 A1* | 4/2008 | Faihe | G06F 11/0748 709/224 |
| 2008/0220873 A1* | 9/2008 | Lee | A63F 13/12 463/42 |
| 2008/0235678 A1 | 9/2008 | Bantz et al. | |
| 2008/0288584 A1* | 11/2008 | Colantuono | H04L 67/125 709/203 |
| 2009/0100419 A1* | 4/2009 | Childress | G06F 8/65 717/171 |
| 2009/0187899 A1* | 7/2009 | Mani | G06F 9/4401 717/168 |
| 2009/0275414 A1* | 11/2009 | Lee | A63F 13/352 463/42 |
| 2010/0100899 A1* | 4/2010 | Bradbury | H04L 65/4092 725/29 |
| 2010/0257517 A1* | 10/2010 | Sriram | G06F 8/658 717/168 |
| 2011/0276695 A1* | 11/2011 | Maldaner | H04L 41/00 709/226 |
| 2012/0011406 A1* | 1/2012 | Williams | G06Q 10/10 714/38.14 |
| 2013/0103827 A1* | 4/2013 | Dunlap | H04L 47/2441 709/224 |
| 2013/0152047 A1* | 6/2013 | Moorthi | G06F 11/368 717/124 |
| 2013/0212185 A1* | 8/2013 | Pasquero | G06Q 10/10 709/206 |
| 2013/0340074 A1* | 12/2013 | Ayachitula | H04L 63/1441 726/22 |
| 2014/0189677 A1* | 7/2014 | Curzi | G06F 8/65 717/171 |
| 2014/0245283 A1 | 8/2014 | Tanaka | |
| 2015/0012624 A1* | 1/2015 | Geiger | H04L 43/0817 709/221 |
| 2015/0019564 A1 | 1/2015 | Higginson et al. | |
| 2015/0019706 A1* | 1/2015 | Raghunathan | G06F 11/3414 709/224 |
| 2015/0058822 A1* | 2/2015 | Elias | G06F 8/71 717/123 |
| 2015/0082292 A1 | 3/2015 | Thomas et al. | |
| 2015/0089488 A1* | 3/2015 | Anderson | G06F 8/65 717/172 |
| 2015/0178063 A1* | 6/2015 | Narkinsky | G06F 8/65 717/168 |
| 2015/0280968 A1* | 10/2015 | Gates | G06F 11/30 714/37 |
| 2015/0280969 A1* | 10/2015 | Gates | G06F 11/30 714/37 |
| 2015/0281011 A1* | 10/2015 | Gates | H04L 41/065 709/224 |
| 2015/0288557 A1* | 10/2015 | Gates | G06F 11/3082 714/37 |
| 2015/0288558 A1* | 10/2015 | Gates | G06F 11/079 714/57 |
| 2016/0011912 A1 | 1/2016 | Rangaraju et al. | |
| 2016/0018125 A1* | 1/2016 | Hamstra | F24F 11/62 700/276 |
| 2016/0085543 A1* | 3/2016 | Islam | G06F 11/1433 717/171 |
| 2016/0092188 A1* | 3/2016 | Kuchibhotla | H04L 67/10 717/176 |
| 2016/0092194 A1* | 3/2016 | Chhatwal | G06Q 10/10 717/170 |
| 2016/0092207 A1* | 3/2016 | Chhatwal | H04L 41/0843 717/121 |
| 2016/0092343 A1* | 3/2016 | Chhatwal | G06F 8/65 717/124 |
| 2016/0246699 A1 | 8/2016 | Edri et al. | |
| 2016/0269312 A1* | 9/2016 | Cavalcante | G06Q 10/0631 |
| 2016/0277404 A1* | 9/2016 | Chen | H04L 63/20 |
| 2016/0283219 A1 | 9/2016 | Banford et al. | |
| 2016/0299933 A1 | 10/2016 | Fillipi et al. | |
| 2017/0034023 A1* | 2/2017 | Nickolov | H04L 43/0817 |
| 2017/0075749 A1* | 3/2017 | Ambichl | G06F 11/0748 |
| 2017/0090904 A1* | 3/2017 | Shida | G06F 11/0709 |
| 2017/0091008 A1* | 3/2017 | Cherbakov | H04L 43/0864 |
| 2017/0222910 A1* | 8/2017 | Cai | H04L 67/34 |
| 2017/0250855 A1* | 8/2017 | Patil | H04L 41/064 |
| 2018/0124094 A1 | 5/2018 | Hamdi | |
| 2018/0131574 A1* | 5/2018 | Jacobs | G06F 8/65 |
| 2018/0131579 A1* | 5/2018 | Jacobs | H04L 41/082 |
| 2018/0143868 A1* | 5/2018 | Johnston | H04L 41/069 |
| 2018/0196402 A1* | 7/2018 | Glaser | G05B 15/02 |
| 2019/0104398 A1* | 4/2019 | Owen | H04L 41/22 |

(56) References Cited

U.S. PATENT DOCUMENTS

2019/0163460 A1\* 5/2019 Kludy .................... G06F 8/63
2019/0303132 A1 10/2019 Krishnaswamy et al.

OTHER PUBLICATIONS

Mark Brehob et al., Applying extra-resource analysis to load balancing, Jan. 9-11, 2000, [Retrieved on Jul. 4, 2019]. Retrieved from the internet: <URL: https://dl.acm.org/citation.cfm?id=338606> 2 Pages (560-561) (Year: 2000).\*
"Getting Started with Incident Tracking and Management in Software Testing (Sample Templates Included)", Retrieved From: https://web.archive.org/web/20151121103113/http:/www.softwaretestinghelp.com/incident-tracking-and-management-process/, Nov. 21, 2015, 10 Pages.
"Patching Oracle Management Agents", Retrieved From: https://web.archive.org/web/20141017002225/https:/docs.oracle.com/cd/E24628_01/doc.121/e24473/patching.htm#EMADM11759, Oct. 17, 2014, 14 Pages.
"Notice of Allowance issued in U.S. Appl. No. 15/940,778", dated Jan. 3, 2019, 10 Pages.
"Non Final Office Action Issued in U.S. Appl. No. 16/409,216", dated Sep. 12, 2019, 28 Pages.
"Notice of Allowance Issued in U.S. Appl. No. 15/940,835", dated Oct. 22, 2019, 8 Pages.
Beattie, et al., "Timing the Application of Security Patches for Optimal Uptime", In Proceedings of LISA: Sixteenth Systems Administration Conference, Nov. 3, 2002, 17 Pages.
"Final Office Action Issued in U.S. Appl. No. 16/409,216", dated Jan. 10, 2020, 7 Pages.

\* cited by examiner

ENABLING TENANT ADMINISTRATORS TO INITIATE REQUEST DRIVEN PEAK-HOUR BUILDS TO OVERRIDE OFF-PEAK PATCHING SCHEDULES

CROSS-REFERENCE TO RELATED APPLICATION

This patent application claims the benefit of U.S. patent application Ser. No. 15/940,835 filed Mar. 29, 2018, now issued as U.S. Pat. No. 10,585,659, entitled "ENABLING TENANT ADMINISTRATORS TO INITIATE REQUEST DRIVEN PEAK-HOUR BUILDS TO OVERRIDE OFF-PEAK PATCHING SCHEDULES," which is hereby incorporated in its entirety by reference.

BACKGROUND

Server farm patching systems mitigate the disruption felt by information workers when system updates are installed on server farms by causing software patches to be installed in a predetermined sequence during off-peak hours. For example, a Software as a Service (SaaS) application that is operated by a server farm may receive periodic software patches for a variety of reasons such as to improve existing features, add new features, correct security vulnerabilities, or fix bugs. Some server farm patching systems install software patches during off-peak hours because doing so may have a temporary negative impact on the performance of machines being updated which may be particularly disruptive during peak business hours when large numbers of users are accessing server farm computing resources.

Unfortunately, some server farm patching systems are ill-suited for quickly alleviating disruption that is felt by information workers when a previously installed system update results in a software regression. For example, developers periodically deploy software updates that are regressive in terms of computing efficiency and, therefore, result in features of software code failing altogether or merely demanding increased processing cycles and/or memory usage as compared to previous versions of the software code. Because modern server farm patching systems install patches in accordance with rigid off-peak patching schedules, information workers are all too often forced to deal with the disruption caused by a software regression throughout an entire work day.

Further, there are currently no mechanisms that enable tenants, e.g., customers, of a system to provide any type of input to influence a patch schedule. Thus, most customers of a centralized service are subject to a one-size-fits-all program when it comes to patches and other upgrades. This can lead to inefficient coordination between a customer's needs and a patch schedule of a system they are using.

It is with respect to these and other considerations that the disclosure made herein is presented.

SUMMARY

Technologies described herein enable a tenant administrator to initiate request driven peak-hour builds to override "off-peak" patching schedules for updating server applications. Embodiments disclosed herein determine an "off-peak" patching schedule for causing builds of software patches (referred to herein as "patches") to be sequentially installed on server farms during an off-peak usage time-range. In this way, the disruption that results from the process of installing the builds is minimized from the perspective of information workers using the server applications. Notwithstanding the existence of the "off-peak" patching schedule, embodiments disclosed herein further enable a tenant administrator to initiate a request driven peak-hour build when some disruption is occurring during peak business hours as a result of an unresolved performance failure of the server application. For example, the tenant administrator may generate a service request that includes incident data that is usable to identify and/or develop a particular patch for resolving the performance failure. The service request may further include a severity indicator that indicates a severity of the disruption caused by the performance failure. Additionally, or alternatively, the service request may include a peak-hour patching consent that indicates a consent of the tenant administrator for the particular patch to be installed during a peak usage time-range.

Then, based on the service request that is generated by the tenant administrator, the "off-peak" patching schedule is overridden to expedite an out-of-sequence installation of whichever build is first to include the particular patch. In this way, a tenant administrator that becomes aware that some performance failure is being disruptive to information workers during a peak usage time-range (e.g., business hours) may be empowered to initiate a request driven peak-hour build to quickly resolve the performance failure during the peak usage time-range. Thus, when a performance failure is disruptive to information workers of a particular tenant, a tenant administrator for that particular tenant can take immediate action to resolve the performance failure by initiating an installation of the particular patch on a server farm that is facilitating the particular tenant. At the same time, other server farms that are supporting other tenants which are unaffected by the performance failure are not subjected to unnecessary service disruptions which do not alleviate some immediate pain (e.g., workflow disruption) being experiences by tenants thereof.

By enabling tenant administrators to expedite installations of patches that resolve some currently felt performance failure, the impact of the performance failure on the computing resources is reduced as compared to existing server farm patching systems. For example, if the performance failure is a software regression, expediting a fix to the software regression will reduce utilization of computing resources such as processor cycles, power, and memory to name a few. Other technical benefits not specifically mentioned herein can also be realized through implementations of the disclosed subject matter.

As used herein, the term "build" when used in the context of a build of patches may refer to an instance of computer code that contains one or more patches for modifying a server application (e.g., a software application that is executable by one or more server machines). The builds of patches may be arranged as a sequence of builds in which successive builds within the sequence include incremental additions to a set of patches. As a specific but non-limiting example, a first build may include only a first patch whereas a second build includes both the first patch and a second patch. Further adding to this specific example, a third build may include a third patch in addition to both of the first patch and the second patch. Stated plainly, each successive build may include all of the patches which were included in the immediately previous build and also one or more additional patches. Thus, with respect to a machine (e.g., a server(s) within the server farm) on which only the first build has been installed, installation of the third build may obviate any benefit of installing the second build since the third build is inclusive of all the patches that are included within the second build.

Since successive builds may be inclusive of patches from previous builds, installing a particular build on a server farm out-of-sequence may obviate the benefits of installing previous builds that are ordered between the previous build and the particular build. Stated alternatively, an out-of-sequence installation of a particular build may obviate a need to install one or more intermediate builds. Continuing with the example from the previous paragraph, the second build may aptly be described as an intermediate build with respect to the first build and the third build because the second build is ordered after the first build and prior to the third build.

It can be appreciated that performing system updates on a machine by installing an individual build of patches results in some incremental demand and/or strain being placed on the inherently limited computing resources of the machine (e.g., server computers are limited in terms of memory and available processing power). For example, installing a build will require the processor(s) of the machine to perform additional processing cycles and a memory of the machine to perform additional read and write operations. Accordingly, by preventing intermediate builds from being installed on a server farm after a tenant administrator initiates an out-of-sequence installation to resolve the performance failure, the demand on the computing resources available to that server farm may be further reduced since one or more build processes can be avoided.

To further reduce the usage of various computing resources, preventing installation of intermediate builds on the server farm may include refraining from even transmitting the intermediate builds to the server farm. Thus, aside from the reduced computing resource demand that results from foregoing an installation process for the intermediate build(s), the individual machine(s) of the server farm are further alleviated from even having to receive the intermediate build(s) via a network interface and/or store the intermediate build(s) in memory and/or a non-volatile storage location. Additionally, refraining from transmitting the intermediate builds to the server farm reduces network traffic and, therefore, frees up additional bandwidth for the server farm to service client requests that are received from various client sites in association with supported tenants.

To illustrate the forgoing technical benefits, suppose that the cumulative size of all the patches included within the second build is equal to nine-hundred "900" megabytes (MB) and that an expedited installation of the third build out-of-sequence (e.g., before the second build is transmitted to the server farm) obviates any benefits of installing the second build. Under these circumstances, refraining from transmitting the second build to the server farm will reduce network traffic to the server farm by 900 MB for each machine that resides within the server farm. Thus, if the server farm consists of one-thousand machines (e.g., a modest number of computer servers in comparison to modern server farms), then refraining from transmitting the second build to the server farm may reduce network traffic to the server farm by 900 gigabytes (GB).

It should be appreciated that any reference to "first," "second," etc. items and/or abstract concepts within the description is not intended to—and should not—be construed to necessarily correspond to any reference of "first," "second," etc. elements of the claims. In particular, within this Summary and/or the following Detailed Description, items and/or abstract concepts such as, for example, individual "software" patches and/or builds and/or server farms may be distinguished by numerical designations without such designations corresponding to the claims or even other paragraphs of the Summary and/or Detailed Description. For example, any designation of a "first build" and "second build" within a paragraph of this disclosure is used solely to distinguish two different "builds" within that specific paragraph—not any other paragraph and particularly not the claims.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical to refer to each individual item. Generic references to the items may use the specific reference number without the sequence of letters.

DETAILED DESCRIPTION

Figure 1:
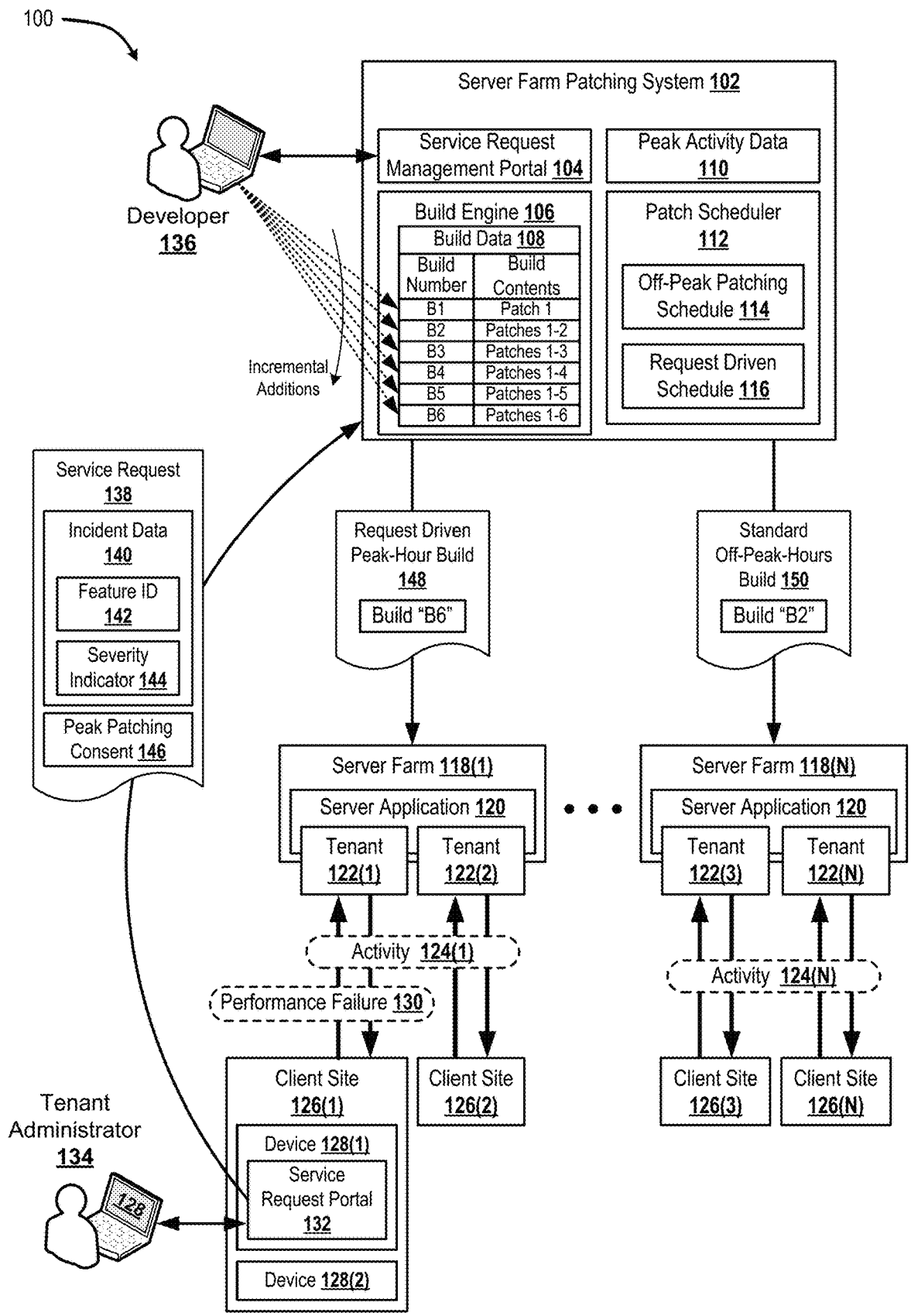
FIG. 1 illustrates a system for enabling a tenant administrator to initiate a request driven peak-hour build that overrides an off-peak patching schedule to expedite resolution of a performance failure.

The following Detailed Description is directed toward a system for enabling a tenant administrator to initiate request driven peak-hour builds to override "off-peak" patching schedules for updating a server application. Generally described, embodiments disclosed herein determine an "off-peak" patching schedule for installing builds of patches on server farms during corresponding off-peak usage times. Under circumstances where the server application is operating as expected, installing builds in accordance with the "off-peak" patching schedule helps to minimize any resulting disruption to information workers. However, under circumstances where information workers are being disrupted by some performance failure of the server application, rather than delaying the installation in accordance with the "off-peak" patching schedule it may be less disruptive to expedite installation of a patch to resolve the issue during peak business hours.

Accordingly, notwithstanding the existence of the "off-peak" patching schedule, embodiments disclosed herein further enable a tenant administrator to initiate a request driven peak-hour build when an unresolved performance failure is disrupting information workers during peak business hours. The tenant administrator may generate a service request including incident data that is usable to identify and/or develop a particular patch for resolving the performance failure. Then, based on the service request, the "off-peak" patching schedule is overridden to expedite installation of whichever build is first to include the particular patch.

In this way, a tenant administrator that becomes aware that some performance failure is being disruptive to information workers during peak business hours is empowered to initiate a request driven peak-hour build to quickly resolve the performance failure during the peak business hours (e.g., immediately and/or without delay once the particular patch becomes available). Thus, when a performance failure disrupts information workers of a particular tenant, a tenant administrator can take immediate action to resolve the performance failure by initiating an installation of the particular patch on a server farm that is facilitating the particular tenant. At the same time, other server farms that are supporting other tenants which are unaffected by the performance failure are not subjected to unnecessary service disruptions.

In contrast to existing server farm patching systems which rigidly adhere to sequential installations of builds in accordance with an "off-peak" patching schedule, expediting an out-of-sequence installation of whichever build initially includes the particular patch may reduce the impact that the performance failure has on the computing resources of the server farm. To illustrate this point, consider that a common type of performance failure may be a software regression that causes a functionality of a software application to demand increased computing resources (e.g., processor cycles and/or memory) as compared to a previous version of the software application. For example, installation of a particular build may result in an inadvertent software regression that is identified only upon being operational in a live computing environment. Under these circumstances, overriding the "off-peak" patching schedule to expedite installation of a particular patch that resolves the software regression will reduce the time in which the computing resources are experiencing increased demand due to the software regression. Thus, by empowering the tenant administrator to initiate the request driven peak-hour build to override the "off-peak" patching schedule, the total duration of time that the performance failure persists is reduced. Since the performance failure may be a cause of increased demand on and/or utilization of computing resources such as processor cycles, power, and memory to name a few, expediting resolution of the performance failure reduces the overall utilization of computing resources of the "affected" server farms.

Turning now to FIG. 1, illustrated is a system 100 for enabling a tenant administrator 134 to initiate a request driven peak-hour build 148 that overrides an off-peak patching schedule 114 to expedite resolution of a performance failure 130. An exemplary performance failure 130 may include, but is not limited to, a software regression that impacts the computational efficiency of a functionality of a server application 120. Therefore, as discussed above, empowering the tenant administrator 134 to initiate resolution of the performance failure 130 faster than would be done by adhering to the off-peak patching schedule 114 is an effective way to improve the computational efficiency of the server application 120.

As illustrated, the system 100 includes a server farm patching system 102 that is configured to distribute software patches (referred to herein as "patches") to server application(s) 120 that are executed by a server farm 118. As used herein, the term "patch" may refer generally to a piece of software code that can be added to a server application 120 to add and/or modify features, resolve security vulnerabilities, fix software "bugs," etc. For example, upon learning that some event has inadvertently broken a particular functionality of the server application 120, a developer 136 may design a patch to fix that particular functionality while having little or no impact on other aspects of the server application 120. As used herein, the term "build" when used in the context of a build of patches may refer to a data package that contains one or more patches for modifying the server application 120. As a specific but non-limiting example, the developer 136 may design three different patches that each fix and/or modify a different aspect of the server application 120. Then, these three different patches may be packaged into a single build that can be transmitted to a server farm 118.

The server farm patching system 102 may include and/or be in communication with a build engine 106 that enables a developer 136 to design patches to resolve various performance failures 130 and also to package the patches into individual builds. Upon generating the individual builds, the developer 136 may add the builds to build data 108. In various implementations, the builds of patches may be arranged as a sequence of builds in which successive builds within the sequence include incremental additions to a set of patches. As a specific but non-limiting example, a first build may include only a first patch whereas a second build includes both the first patch and a second patch. Further adding to this specific example, a third build may include a third patch in addition to both of the first patch and the second patch. Stated plainly, each successive build may include all of the patches which were included in the immediately previous build and also one or more additional patches. This may occur when the developer 136 follows a process of generating a new "up-to-date" build each time a new patch is developed by adding the new patch to the immediately previous build within the sequence. Thus, with respect to a machine (e.g., a server(s) within the server farm) on which only the first build has been installed, installation of the third build may obviate any benefit of installing the second build since the third build is inclusive of all the patches that are included within the second build.

The server farm patching system 102 may communicate with multiple server farms 118 to periodically transmit builds of patches to individual ones of the server farms 118.

In the illustrated example, the system 100 includes a first server farm 118(1) and an N<sup>th</sup> server farm 118(N). As used herein, the term "server farm" may refer to a collection of computer servers that are interconnected to provide one or more tenants with server functionality that is beyond the capabilities of a single machine. The first server farm 118(1) is facilitating a first tenant 122(1) that is serving a first client site 126(1) and a second tenant 122(1) that is serving a second client site 126(2). The N<sup>th</sup> server farm 118(N) is facilitating a third tenant 122(3) that is serving a third client site 126(3) and an N<sup>th</sup> tenant 122(N) that is serving an N<sup>th</sup> client site 126(N). As used herein, the term "tenant" may refer generally to a logical block of data that is owned and managed by an entity. The entity may be provisioned with access rights for accessing the tenant via one or more devices 128 (e.g., laptop computers, smart phones, etc.) that are being operated at one or more client sites 126. An exemplary client site 126 may be a physical office building that is occupied by an entity and that provides interne connectivity to enable devices 128 to generate activity 124 between the server farms 118 and the client sites 126 or, more specifically, the devices 128.

For purposes of the present discussion, presume that the build data 108 is compiled so as to arrange the patches in a sequence of builds in which successive builds within the sequence include incremental additions to a set of patches. In the illustrated example, the build data 108 includes six ("6") sequential builds that are individually labeled "B1" through "B6" and which each include an incremental addition of one patch as compared to the immediately previous build in the sequence, if applicable (e.g., no build precedes build "B1"). Specifically, build B1 includes a first patch, build B2 includes the first patch and a second patch, build B3 includes the first and second patches and a third patch, and so on. Stated plainly, each successive build includes all of the patches which were included in the immediately previous build and also one or more additional patches. Thus, in the present example, installation of a particular patch may obviate any benefit of installing other builds that are earlier in the sequence since the particular patch will include all of the patches that are included within the earlier builds.

Similar to other system update processes, installing a build of patches onto a server farm 118 may result in some impact to the performance and/or stability of the machines that are being updated. This impact may be disruptive to information workers (e.g., employers of an enterprise corresponding to a particular tenant 122) which are utilizing and/or attempting to utilize the functionalities provided by the server farm 118 during the installation process. For example, individual ones of the server farms 118 may execute a server application 120 for facilitating one or more tenants 122 which ultimately serve one or more client sites 126. It can be appreciated that during peak business hours for the tenant(s) 122 of any individual server farm 118, the amount of activity 124 that is occurring between the individual server farm 118 and the client sites 126 may be higher than during an off-peak usage time-range. This is because a number of users that are actively generating service loads is generally greater during peak business hours than during an off-peak usage time-range. Therefore, under typical circumstances where the server application 120 is operating as expected, installing individual builds of patches may be particularly disruptive to work-flows when done during peak-business hours of a tenant 122.

The server farm patching system 102 may mitigate the level of disruption by causing the builds of patches to be installed during an off-peak usage time-range for the tenants 122 of a server farm 118, e.g., when the level of activity 124 is low. In some implementations, when a new build of patches is ready to be deployed to individual ones of the server farms 118, the server farm patching system 102 may determine which tenants 122 are in an off-peak usage time-range and then limit deployment of the new build to the server farms 118 that are facilitating those tenants 122. Then, as an off-peak usage time-range begins for other tenants 122 that are facilitated by other server farms 118, the server farm patching system 102 may automatically deploy the new build to those other server farms 118 as well. In this way, the server farm patching system 102 may prevent an information worker (e.g., an end user that is operating a device 128 at a client site 126) from having a workflow disrupted due to a build of patches being hastily installed during business hours.

In order to ensure that builds are installed outside of peak business hours when the server application 120 is operating as expected, the server farm patching system 102 includes a patch scheduler 112 that is configured to generate patching schedules for the individual server farms 118 based on off-peak usage time-ranges that are determined for the individual server farms 118. Individual patching schedules may define one or more scheduled times for installation of builds on individual ones of the server farms 118. A scheduled time may be a discrete moment in time or, alternatively, a time-range. For purposes of the present discussion, presume that the scheduled time for the first server farm 118(1) is the discrete time of 1:30 AM Pacific Standard Time (PST) whereas the scheduled time for the N<sup>th</sup> server farm 118(N) is the time-range of 3:30 AM Eastern Standard Time (EST) to 5:10 AM EST.

In some embodiments, the patch scheduler 112 may automatically determine the off-peak usage time-range based on peak activity data 110 that indicates how the levels of activity 124 for any particular server farm 118 tend to vary over a particular time period (e.g., a day, a week, a year, etc.). For example, the peak activity data 110 may indicate that first activity 124(1) between the first server farm 118(1) and the corresponding client sites 126 is generally highest between the hours of 7:00 AM to 8:00 PM. The peak activity data 110 may further indicate that outside of these peak business hours the first activity 124(1) is lower and typically reaches a minimum level generally at roughly 1:30 AM PST. Stated alternatively, the patch scheduler 112 may determine an off-peak usage time-range for individual server farm(s) 118 based on peak activity data 110 that indicates patterns of activity 124 corresponding to the individual server farms 118 and/or tenants 122 thereof. Accordingly, under these specific exemplary circumstances, the patch scheduler 112 may set a scheduled time for installation of the builds on the first server farm 118(1) as 1:30 AM PST.

In some embodiments, the server farm patching system 102 monitors the activity 124 continuously and/or periodically to generate the peak activity data 110. For example, the server farm patching system 102 may monitor the first activity 124(1) between the first server farm 118(1) and corresponding client sites 126 over a period of time (e.g., a day, a week, a month, etc.) to generate a portion of the peak activity data 110 that specifically corresponds to the first server farm 118(1). Then, based on that portion of the peak activity data 110, the patch scheduler 112 may automatically determine the scheduled time for installing builds on the first server farm 118(1) as described above.

Alternatively, or additionally, to determining the off-peak usage time-range based on peak activity data 110, the server farm patching system 102 may determine the off-peak usage time-range (and therefore the scheduled times for installation) based on which geographic regions correspond to the various tenants 12 being served by individual server farms 118. To illustrate this point, suppose that the tenants 122 that are served by the first server farm 118(1) each reside within Washington State of the United States of America and, therefore, each reside within the Pacific Time Zone. Under these circumstances, the server farm patching system 102 may determine the scheduled times for installing the builds on the first server farm 118(1) based on data indicating a general (e.g., non-tenant specific) off-peak usage time-range for Pacific Standard Time (PST).

Additionally, or alternatively, to automatically determining the scheduled times based on the peak activity data 110 and/or geographic regions, the server farm patching system 102 may also receive user input that is designed to designate the scheduled time(s) for individual server farms 118. For example, the tenant administrator 134 that is authorized to manage various aspects of the first tenant 122(1) may manually set the off-peak usage time-range for the first tenant 122(1). As another example, a server farm administrator that has authority to manage aspects of the first server farm 118(1) may prescribe an off-peak usage time-range for the first server farm 118(1) based on various factors, such as, an analysis of a requests-per-second report that indicates when server farm usage is minimal.

In various embodiments, the patching schedule for any particular server farm 118 may define which build of the sequence of builds is the next build in queue to be installed. For purposes of the present discussion, presume that the next build in queue for both of the first server farm 118(1) and the Nth server farm 118(N) is build B2. Therefore, under circumstances where the server application 120 is operating as expected (e.g., no performance failures 130 are occurring), the server farm patching system 102 will wait until the scheduled time for any individual server farm 118 before sending that server farm 118 a standard off-peak-hours build 150.

Under a variety of circumstances, performance failures 130 may occur as the server farm(s) implement, or attempt to implement, particular functionalities of a server application 120 (e.g., a SaaS email application). As a specific but non-limiting example, the server application 120 may be configured to provide an email functionality to enable large files (e.g., files over 25 MB) to be shared via a link embedded in an email rather than attaching the large file to the email itself. Continuing with this specific example, during peak business hours when the server farm(s) 118 are experiencing a high level of activity 124, this particular email functionality may begin to have performance failures 130 such as, for example, one or more of the embedded links failing to provide access to the corresponding large files. Such performance failures 130 may be caused by a variety of computing events such as, for example, malware software code being inadvertently received at the server farm(s) 118 and/or a software regression resulting from a build of patches being installed on the server farm(s) 118.

When a performance failure 130 occurs in association with a particular tenant 122, a corresponding tenant administrator 134 may access a service request portal 132 to generate a service request 138 that informs the server farm patching system 102 of the performance failure 130. The service request portal 132 may be a web-based portal that enables the tenant administrator 134 to manage aspects of the tenant 122 such as, for example, by setting up user accounts for the tenant 122, managing server application 120 subscriptions associated with the tenant, etc. An exemplary service request portal 132 will cause a web-browser application to display various user interface (UI) elements such as graphical buttons and/or sliding dials that enable the tenant administrator 134 to define aspects of the service request 138 such as the severity indicator 144 and/or the peak patching consent 146. As illustrated, the service request 138 may include incident data 140 that indicates various characteristics of the performance failure 130. Exemplary characteristics include, but are not limited to, a feature identifier (ID) 142 to identify which specific feature of the software application 120 that is being run by the server farm(s) 118 has failed, diagnostics data that is usable by developers to resolve the performance failure 130, a severity indicator 144 indicating a severity of the disruption being caused by the performance failure 130, and any other characteristic suitable for inclusion in the incident data 128.

In some implementations, the service request 138 may also include a peak patching consent 146 that that is provided by the tenant administrator 134. For example, as described above, under typical circumstances the builds of patches may be transmitted to the server farms 118 in standard off-peak-hours builds 150 to cause installation of the builds to occur outside of peak business hours. However, under circumstances where the performance failure 130 is disrupting information workers during peak business hours, the tenant administrator 134 may ascertain that the disruption which would result from installing a patch to resolve the performance failure 130 would be minimal compared to the disruption the performance failure 130 would cause if permitted to continue throughout the business day. Accordingly, when generating the service request 138 the tenant administrator 134 may provide the server farm patching system 102 with consent to override the off-peak patching schedule to resolve the performance failure as soon as possible.

Responsive to receiving a service request 138 in association with a tenant 122 that is being facilitated by a particular server farm 118, the server farm patching system 102 may alter the patching priority for the particular server farm 118. As a specific but non-limiting example, under circumstances where the server application 120 is operating as expected on a particular server farm 118, a patching priority for this particular server farm 118 may be designated as "STANDARD" to cause builds to be transmitted and/or installed in accordance with the off-peak patching schedule 114 for that particular server farm 118. In contrast, under circumstances where one or more tenants 122 of the particular server farm 118 is experiencing a performance failure 130 in association with the server application 120, the patching priority for this particular server farm 118 may be increased to "HIGH" to override the off-peak patching schedule 114 and expedite installation of whichever build is first to include a particular patch that is designed to resolve the performance failure 130.

Overriding the off-peak patching schedule 114 may include identifying whichever build is the first build to include a particular patch that is designed to resolve the performance failure and then transmitting this build to a particular server farm 118 in lieu of the next build in queue for that particular server farm 118. As stated above, in the present example the next build in queue for both of the first server farm 118(1) and the Nth server farm 118(N) is build B2. Further presume that in this example, the patch 6 is the particular patch that is designed to resolve the performance failure 130 and, therefore, the build B6 is the first build to include this particular patch. Therefore, as illustrated, the server farm patching system 102 may respond to receiving the service request 138 by overriding the off-peak patching schedule 114 and sending the build B6 to the first server farm 118(1) in the request driven peak-hour build 148. In other words, the server farm patching system 102 responds to the service request 138 by deviating from the off-peak patching schedule 114 and following a request driven schedule 116. This enables the tenant administrator 134 to request transmission of the request driven peak-hour build 148 during peak business hours to resolve performance failures 130 more expediently than existing server farm patching systems permit.

In the illustrated example, since no service request 138 is received in association with the $N^{th}$ server farm 118(N), the server farm patching system 102 adheres to the off-peak patching schedule 114 with respect to the $N^{th}$ server farm 118(N). In accordance with the off-peak patching schedule 114, therefore, the server farm patching system 102 transmits to the $N^{th}$ server farm 118(N) the standard off-peak-hours build 150 with the build B2 included therein.

It can be appreciated that the techniques described herein are effective at ensuring that software regressions and/or other issues with software code of a server application 120 are efficiently resolved in a manner so as to lessen the impact on information workers and/or on computing resources. To illustrate this point, consider that in the example illustrated in FIG. 1 both of the first activity 124(1) and the $N^{th}$ activity 124(N) correspond to different tenants 122 utilizing various functionalities of the server application 120. However, for some reason, the first client site 126(1) is the only client site that is experiencing the performance failure 130. For example, perhaps the software regression that is causing the performance failure 130 is related to a feature that only employees of the first tenant 122(1) habitually use. Since the employees of the first tenant 122(1) are actually being negatively impacted by the software regression, the tenant administrator 134 generates the service request 138 which in turn triggers the request driven peak-hour build 148—which specifically includes a build for resolving the performance failure 130. Since the $N^{th}$ activity 124(N) is not impacted by the software regression, no corresponding service request 138 is generated and, therefore, the server farm patching system 102 adheres to the "predetermined" off-peak patching schedule 114 by waiting until off-peak hours before sending the standard off-peak-hours build 150—which includes the next build in queue.

In some embodiments, the server farm patching system 102 may analyze aspects of the service request 138 to identify a patch and/or build that is designed to resolve the performance failure 130. For example, responsive to receiving the incident data 128 within the service request 138, the server farm patching system 102 may analyze characteristics of the performance failure 130 against the build data 108 to identify a particular patch this is designed to resolve the performance failure 130. Continuing with the above example in which the performance failure is associated with the email functionality for providing access to large files via links that are embedded within emails, the particular patch may be designed to resolve a software regression that caused the embedded links to stop functioning properly.

In some implementations, the server farm patching system 102 may be configured to communicate, to the tenant administrator 134, an estimated relative impact of overriding the off-peak patching schedule 112 to resolve the performance failure prior to an off-peak usage time. For example, the server farm patching system 102 may determine if it would likely be more or less disruptive to install a patch to resolve the issue as soon as possible (e.g., as soon as the patch becomes available for deployment) or to wait until the off-peak usage time. Then, the server farm patching system 102 may communicate this determination to the tenant administrator 134 via the service request portal 132. It should be appreciated that being informed as to the estimated relative impact of expediting a build installation during peak business hours versus initiating the build installation at the next scheduled time may assist the tenant administrator 134 in determining whether to include the peak patching consent 146 within the service request 138. For example, if the estimated relative impact indicates that overriding the patching schedule to expedite resolution of the performance issue will cause less overall disruption to end users than waiting until the next scheduled time, the tenant administrator 134 may be inclined to provide the peak-patching consent 146 to trigger the request driven peak-hour build 148.

To determine the estimated relative impact, the server farm patching system 102 may analyze the incident data 140 to determine a first estimated impact that the performance failure 130 is likely to cause if resolved at the next scheduled time per the off-peak patching schedule 114. For example, the incident data 140 may indicate a frequency of the performance failure 130 and a severity of the performance failure 130. Then, the server farm patching system 102 may determine the first estimated impact based on the frequency and/or severity of the performance failure 130 and also a time span between a current time and the next scheduled time. For example, if there are eight hours remaining until the next scheduled time, the first estimated impact may be determined by multiplying the frequency (e.g., in occurrences of the performance failure per hour) times the severity (e.g., the disruption caused by a single performance failure) times the eight-hour time span until the next scheduled time.

Also, in order to determine the estimated relative impact, the server farm patching system 102 may analyze the build data 108 to determine a second estimated impact that is likely to result from causing the "affected" server farms 118 (i.e., those server farms 118 that have experienced and/or are experiencing the performance failure) to be updated prior to the next scheduled time. As described above, for example, causing patches to be installed may result in some negative impact to the performance or stability of the machines being updated. This issue is the underlying reason why system updates are generally installed in accordance with the off-peak patching schedule 114 to cause system updates (e.g., build installations) to occur outside of peak business hours. In some implementations, the server farm patching system 102 may analyze relevant information such as, for example, the build data 108 to identify a complexity of the build that will resolve the performance failure and previous update times which were required to install other builds of similar complexity. In this way, the server farm patching system 102 may determine an estimated time that will be required to install the build.

Based on analyzing the relevant information, the server farm patching system 102 may determine the second estimated impact. For example, the relevant information may indicate that the build installation may cause only 15 minutes of system downtime during which the "affected" server farm 118 will be unable to service requests from the client sites 126. The relevant information may further indicate that the level of activity 124 at the current time is relatively low as compared to other times within peak business hours. For example, the patch to resolve the performance failure 130 may become available shortly after the incident data 140 is received very early in the morning before many employees have begun to work. For example, the first performance failure may occur at 7:00 AM PST and the developer 136 may add the patch to the build data 108 at 7:30 AM PST when few users are generating any activity 124 between their device(s) 128 and the affected server farm 118.

Under this specific but non-limiting example, the second estimated impact indicates that the performance failure can be resolved prior to the activity 124 reaching peak levels for the day and the first estimated impact indicates that waiting to resolve the issue will cause high levels of disruption during the upcoming work day. Accordingly, in this example, the estimated relative impact indicates that expediting the build installation to resolve the performance failure 130 as soon as possible will be less disruptive to end users than waiting until the next scheduled time to initiate the build installation. Therefore, based on estimated relative impact, the server farm patching system 102 may overrides the off-peak patching schedule 114 and expedites generation and transmission of the request driven peak-hour build 148 to the affected server farm 118.

In some implementations, overriding the off-peak patching schedule 114 may be conditioned on the peak patching consent 146 being included within the service request 138. For example, upon receiving the service request 138, the server farm patching system 102 may identify the particular patch that is designed to resolve the performance failure 130. Then, if the service request 138 includes the peak patching consent 146, the off-peak patching schedule 114 may be overridden and the request driven peak-hour build 148 may be transmitted to the affected server farm 118 during peak-business hours. However, if the service request 138 does not include the peak patching consent 146, the server farm patching system 102 may adhere to the off-peak patching schedule 114 and the standard off-peak-hours build 150 may be transmitted to the affected server farm 118 at the next scheduled time. In this way, the tenant administrator 134 may be empowered to substantially control whether the particular patch is installed during peak-business hours or during off-peak hours.

In some implementations, overriding the off-peak patching schedule 114 may be responsive to the estimated relative impact indicating that it is likely to be more disruptive to delay resolution of the performance failure in accordance with the off-peak patching schedule 114 as opposed to overriding the off-peak patching schedule 114 to resolve the performance failure 130 during peak-business hours. For example, in some instances, the server farm patching system 102 may transmit the request driven peak-hour build 148 in lieu of the standard off-peak hours build 150 based on the estimated relative impact even if the service request 138 does not explicitly consent to initiating an installation during peak hours.

In some implementations, the developer 136 may view and/or analyze the service request 138 via a service request management portal 104 that enables the developer to indicate one or more actions to be taken by the server farm patching system 102 in response to the service request 138. For example, upon a service request 138 being received at the server farm patching system 102, an incident identifier may be created that corresponds to the performance failure 130. The incident identifier may include the incident data 140 so that other similar and/or identical performance failures 130 can be identified so that their corresponding server farms can be tagged with the incident identifier. Then, the developer 136 can define one or more actions that are to be performed by the server farm patching system 102 with respect to affected server farms 118. As other performance failures 130 occur that are similar and/or identical to the performance failure 130 for which the incident identifier was created, the corresponding affected server farms 118 updated in accordance with the one or more actions defined by the developer 136 for the incident identifier.

Figure 2:
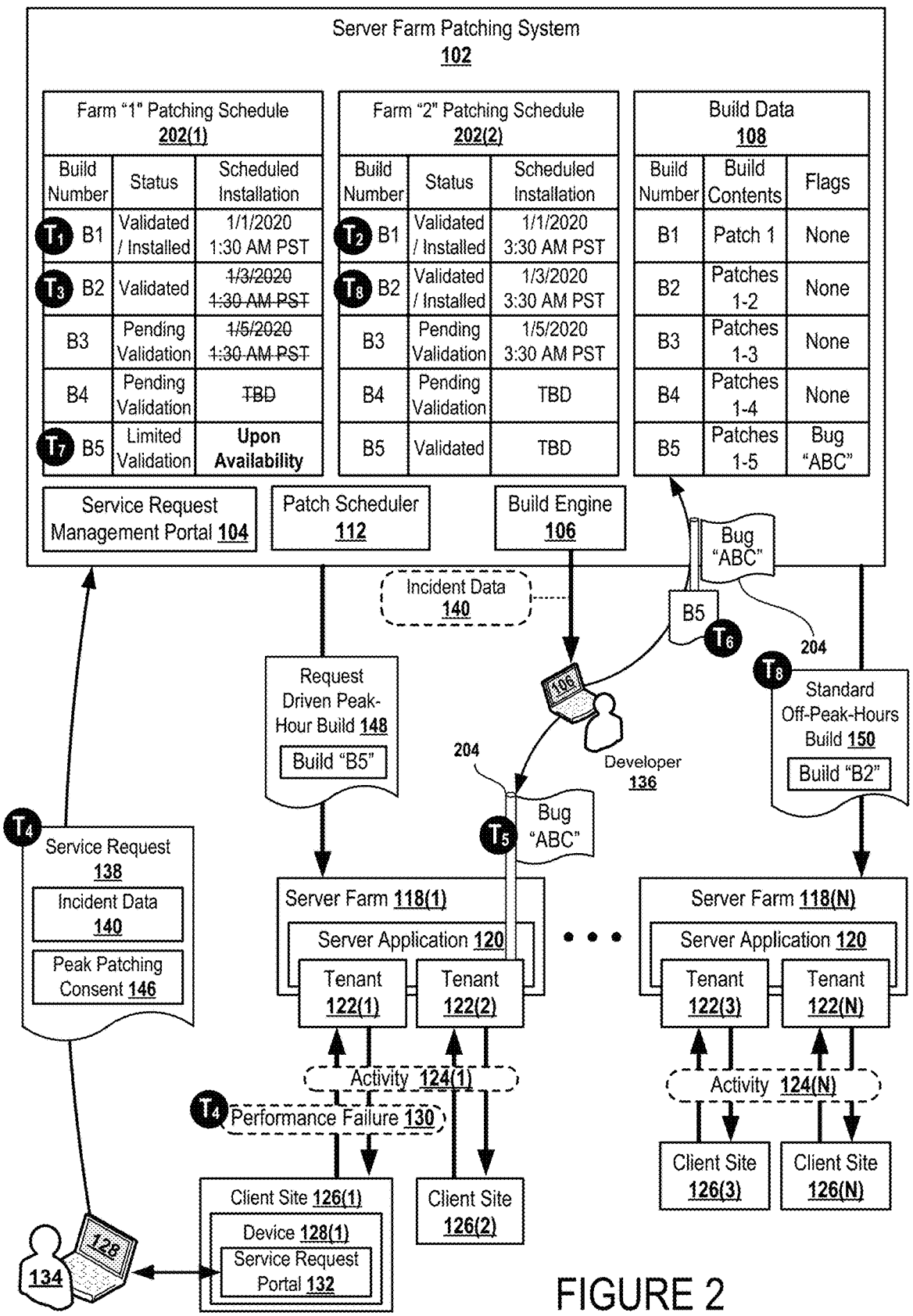
FIG. 2 illustrates a system for enabling a developer to receive incident data that is included within a service request and, based thereon, to associate a flag with an individual server farm to override a scheduled build.

Turning now to FIG. 2, illustrated is a system 200 for enabling a developer 136 to receive incident data 140 that is included within a service request 138 and, based thereon, to associate a flag 204 with an individual server farm 118 (and/or tenant 122 thereof) to override a scheduled build. In this example, overriding the scheduled build includes causing a request driven peak-hour build 148 to be transmitted to the individual server farm 118 rather than a standard off-peak-hours build 150. It is worth noting that in FIG. 2, the standard off-peak-hours build 150 that is over-ridden is associated with the first server farm 118(1) and is not illustrated whereas another standard off-peak-hours build 150 associated with the $N^{th}$ server farm 118(N) is not over-ridden and is illustrated.

To illustrate aspects of the techniques disclosed herein, FIG. 2 illustrates an exemplary data flow scenario in which various operations and/or functionalities occur in a specific order. More specifically, FIG. 2 describes various operations and/or functionalities occurring at eight sequential times that are individually labeled $T_1$ through $T_8$. However, the order in which these operations and/or functionalities are described and/or illustrated herein is not intended to be construed as a limitation. Rather, any number of the operations and/or functionalities described with respect to FIG. 2 may be combined in any order and/or in parallel in accordance with the present disclosure. Other processes and/or operations and/or functionalities described throughout this disclosure shall be interpreted accordingly.

At time $T_1$, a build "B1" is installed on a first server farm 118(1) in accordance with a standard off-peak-hours build (not shown being transmitted in FIG. 2) of a Farm "1" patching schedule 202(1). In some implementations, the patching schedules 202 may indicate one or both of a scheduled date and/or a scheduled time for installing a particular build of patches onto a particular server farm 118. In the illustrated example, the Farm "1" patching schedule 202(1) defines a scheduled installation time for the build "B1" as 1:30 AM PST on Jan. 1, 2020. Therefore, in the exemplary data flow scenario of FIG. 2, time $T_1$ corresponds to this date and time.

At time $T_2$, the build "B1" is installed on an $N^{th}$ server farm 118(N) in accordance with another standard off-peak-hours build (also not shown being transmitted in FIG. 2) of a Farm "2" patching schedule 202(2). In the illustrated example, $T_2$ occurs two hours after $T_1$ so that during peak business hours on Jan. 1, 2020 (e.g., 7 AM to 8 PM and/or any other time-range) both of the first server farm 118(1) and the $N^{th}$ server farm 118(N) have completed respective installations of the build "B1" and operate based on any code modifications that result from one or more patches included in the build "B1."

In some implementations, the server farm patching system 102 may designate a patching priority for the individual server farms 118 that indicates an urgency of causing a subsequent build to be deployed to and installed on the individual server farms 118. The patching priorities may include a "STANDARD" priority which causes the builds to be sequentially installed on the server farms 118 at scheduled time(s) based on the corresponding off-peak patching schedules 114. For purposes of the present discussion, presume that the $N^{th}$ server farm 118(N) is designated with a patching priority of "STANDARD." Therefore, based on this patching priority, the server farm patching system 102 may wait until 3:30 AM EST and then transmit the build "B2" to the N$^{th}$ server farm 118(N). Then, upon receipt of the build "B2," the N$^{th}$ server farm 118(N) may begin to install whichever patches are included in build "B2" but which have yet to be installed.

In some embodiments, the server farm patching system 102 may refrain from installing a build on a particular server farm 118, even in off-peak hours, if the current level of activity 124 for the particular server farm 118 is above an activity level threshold. For example, the server farm patching system 102 may monitor the activity data 124 to determine the current level of activity that is occurring between the server farms 118 and the devices 128. Then, to minimize the disruption caused by installing the next build in queue when the patching priority is set to standard, the server farm patching system 102 may compare the current level of the N$^{th}$ activity 124(N) to the activity level threshold to refrain from initiating the installation of the next build in queue unless the current level of activity is below the activity level threshold (e.g., less than X requests per second where X is a positive integer). In this way, if for some reason there is a higher-than-normal level of activity 124 occurring during off-peak hours, the server farm patching service 102 may recognize this deviation from the norm and react appropriately to prevent interference with the "current" activity 124.

For purposes of the illustrated example, presume that the current level of the N$^{th}$ activity 124(N) is below the activity level threshold. Accordingly, upon the time reaching the scheduled time (e.g., 3:30 AM EST for the N$^{th}$ server farm 118(N)), the server farm patching system 102 may determine that the current level of activity is below the activity level threshold. In response to the current level of the N$^{th}$ activity 124(N) being under the activity level threshold, the server farm patching system 102 transmits the standard off-peak-hours build 150 with the next build in queue (e.g., build "B2" for the N$^{th}$ server farm 118(N)) included therein. If in contrast the current level of the N$^{th}$ activity 124(N) were above the activity level threshold, the server farm patching system 102 would refrain from transmitting the standard off-peak-hours build 150—or otherwise initiating the installation of the next build in queue.

It can be appreciated, therefore, that for builds that are installed according to a "STANDARD" patching priority, one or more off-peak usage time-ranges may come and go before the builds are installed on substantially all of the individual server farms. For example, upon a particular build being released for installation, it may take forty-eight ("48") hours or more to achieve ninety to ninety-five percent ("90-95%") installation coverage across a plurality of server farms.

At time T$_3$, a build "B2" that is scheduled to be installed on the first server farm 114(1) at 1:30 AM on Jan. 3, 2020 is marked as validated on the server farm patching service 102. For example, at some time prior to T$_2$, a developer 136 may utilize the build engine 106 to add a second patch to the build data 108. The second patch may be a standard priority patch that is designed to add functionality to a server application 120 or to modify the server application code in any other manner for which it is suitable to wait until off-peak hours to install (e.g., installation of the standard priority patch may be low in urgency). As described above, under circumstances where the builds are transmitted and/or installed according a "STANDARD" patching priority, the builds will be installed on the server farms 118 in accordance with the patching schedules 202 (e.g., in sequence and/or during an off-peak usage time-range).

At time T$_4$, the first server farm 118(1) may experience a performance failure 130 and, in response thereto, the tenant administrator 136 may respond by transmitting the service request 138 with incident data 140 to the server farm patching service 102. Based on the receipt of the service request 138, the server farm patching system 102 may override one or more scheduled builds within the Farm "1" patching schedule 202(1). For example, the server farm patching system 102 may respond to the service request 138 by cancelling the scheduled installations for one or more intermediate builds. As used herein, the term "intermediate build" may refer generally to a build that is ordered within the sequence of builds after whichever build was last installed on a server farm 118 and prior to another build which is the first build to include a patch designed to resolve the performance failure 130. For purposes of the present discussion of FIG. 2, the build "B5" is the first build within the sequence of builds to include a patch that is designed to resolve the performance failure 130. Therefore, the builds "B2" through "B4" are aptly described as intermediate builds in the exemplary data flow scenario of FIG. 2.

For purposes of the exemplary data flow scenario of FIG. 2, presume that the performance failure 130 corresponds to a software "bug" that has caused a regression in the behavior of the server application 120 which is being run at both of the first server farm 118(1) and the N$^{th}$ server farm 114(N). Further suppose that at time T$_4$ when the performance failure 130 occurs and/or is reported to the server farm patching system 102, a patch has not yet been designed to resolve the performance failure 130. Accordingly, in anticipation of a patch becoming available and added to a "latest" build, the server farm patching system 102 may schedule a particular build to be transmitted within the request driven peak-hour build 148 as soon as it becomes available. For example, as illustrated, the build "B5" has been scheduled for installation "Upon Availability" so that as soon as the patch for resolving the performance failure is available its build is sent out.

Subsequent to time T$_4$, the developer 136 may begin utilizing the build engine 106 to develop a patch that resolves the performance failure 130. For purposes of the present discussion, the developer 136 generates patch "5" to resolve the performance failure 130 and adds patch "5" to the builds to generate build "B5."

At time T$_5$, an association is generated between the flag 204 and the specific tenant 122(2) which experienced the performance failure 130. As illustrated, for example, the flag 204 is graphically shown as being placed on the tenant 122(2). In some implementations, the developer 136 may interact with the build engine 106 to manually associate the flag 204 with the tenant 122(2). In some implementations, server farm patching system 102 may respond to the flag 204 being placed on the tenant 122(2) by increasing the patching priority of the tenant 122(2) and/or first server farm 118(1) from a "STANDARD" patching priority to a "HIGH" patching priority.

It can should be appreciated that server farm computing architectures can be designed in a variety of ways and, in some instances, installation of any particular build on a server farm 118 is agnostic to the individual tenants 122 that are facilitated by that server farm 118. That is, the builds of patches may be installed at the server farm level such that all of the tenants 122 that are facilitated by a particular server farm 118 receive the benefits (and/or drawbacks in the event a bug and/or software regression) that result from any particular build. Therefore, in some implementations, even if only a single tenant 122 on a particular server farm 118 is experiencing a performance failure 130, the particular server farm 118 may be tagged as a whole rather than merely tagging the single tenant 122.

At time $T_6$, the developer 136 uses the build engine 106 to add the build "B5" to the build data 108. As illustrated, the flag 204 may also associated with the particular patch that is designed to resolve the performance issue 130 and/or the build "B5" due to it being the first to include the particular patch. In this way, the server farm patching system 102 may identify a correspondence between the "flagged" build "B5" and the "flagged" server farm 118(1).

At time $T_7$, the build "B5" is designated with a status of that permits the deployment of the build "B5" in the request driven peak-hour build 148 to the specific tenant 122(2) that is experiencing the performance failure 130. As illustrated, the status of the build "B5" has been set at $T_7$ to a particular level (e.g., "Limited Validation") which permits the build to be deployed to individual server farms 118 that have been associated with the flag 204 and/or that facilitate tenants 122 that have been associated with the flag 204. For example, the developer 136 may assign the limited validation status to the build "B5" to cause this build to be deployed to server farms 118 where performance failures 130 are known to exist but to prevent the build from being deployed to other server farms 118 that appear to be functioning as expected.

In some implementations, the server farm patching system 102 is configured to monitor the individual server farms 118 to determine when the flag 204 becomes associated with individual server farms 118. For example, in the example data flow scenario of FIG. 2, the server farm patching system 102 determines when the flag 204 that corresponds to the software bug "ABC" is placed on the specific tenant 122(2) that is experiencing the performance failure 130. Then, the server farm patching system 102 monitors the build data 108 and/or the patching schedules 202 to determine when the particular patch that designed to resolve the performance failure 130 becomes available and respond by automatically deploying the request driven peak-hour build 148. In this way, the request driven peak-hour build 148 may be deployed substantially immediately upon the particular patch becoming available for deployment. Once the request driven peak-hour build 148 is installed on the server farm(s) 118 that are affected by the performance failure 130, the server farm patching system 102 may change the patching priority back from "high" patching priority to the "standard" patching priority. For example, the flag 204 may be removed from and/or unassociated with the first server farm 118(1).

By facilitating the flag 204 to be commonly associated with a specific tenant 122(2) that is experiencing the performance failure 130 and also a particular patch that is designed to resolve the performance failure 130, the techniques described herein enable the particular patch to be expeditiously deployed at a "HIGH" patching priority level with precise granularity. For example, the techniques described herein enable deployment of the particular patch to be expedited (e.g., sent out with "HIGH" patching priority) with respect to only those server farms 118 that facilitate tenants 122 that are experiencing the performance failure 130. Then, the particular patch may be deployed at a "STANDARD" patching priority to those server farms 118 which do not facilitate tenants 122 which are experiencing the performance failure 130.

Then, due to the $N^{th}$ server farm 118(N) being designated with the "STANDARD" patching priority, at $T_8$ the server farm patching system 102 may transmit a standard off-peak-hours build 150 that includes the next build in queue (e.g., build "B2" for the $N^{th}$ server farm 118(N)).

Figure 3:
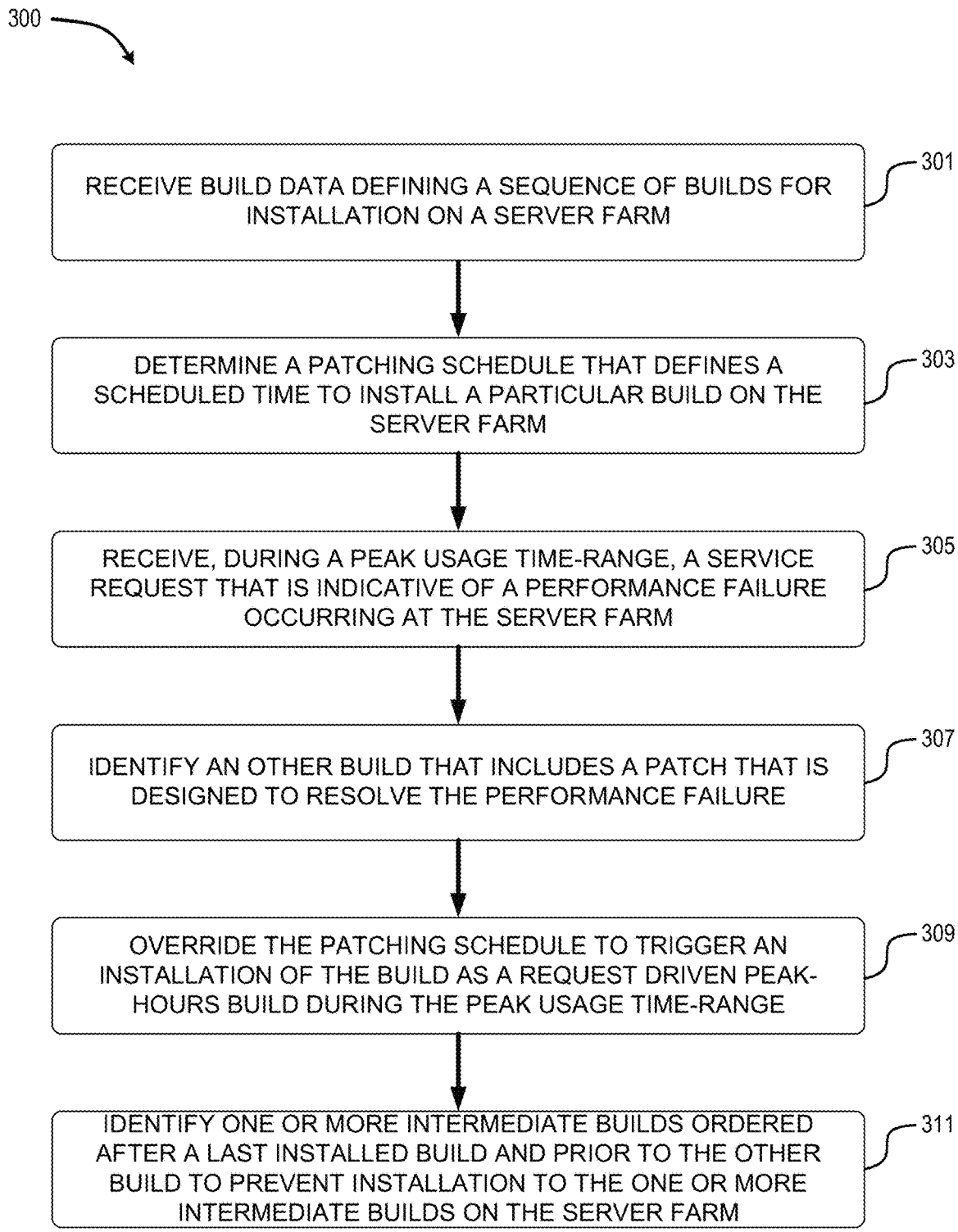
FIG. 3 illustrates a flow diagram of an example method for enabling a tenant administrator to generate a service request that initiates a request driven peak-hour build to expedite a resolution for a performance failure.
Figure 4:
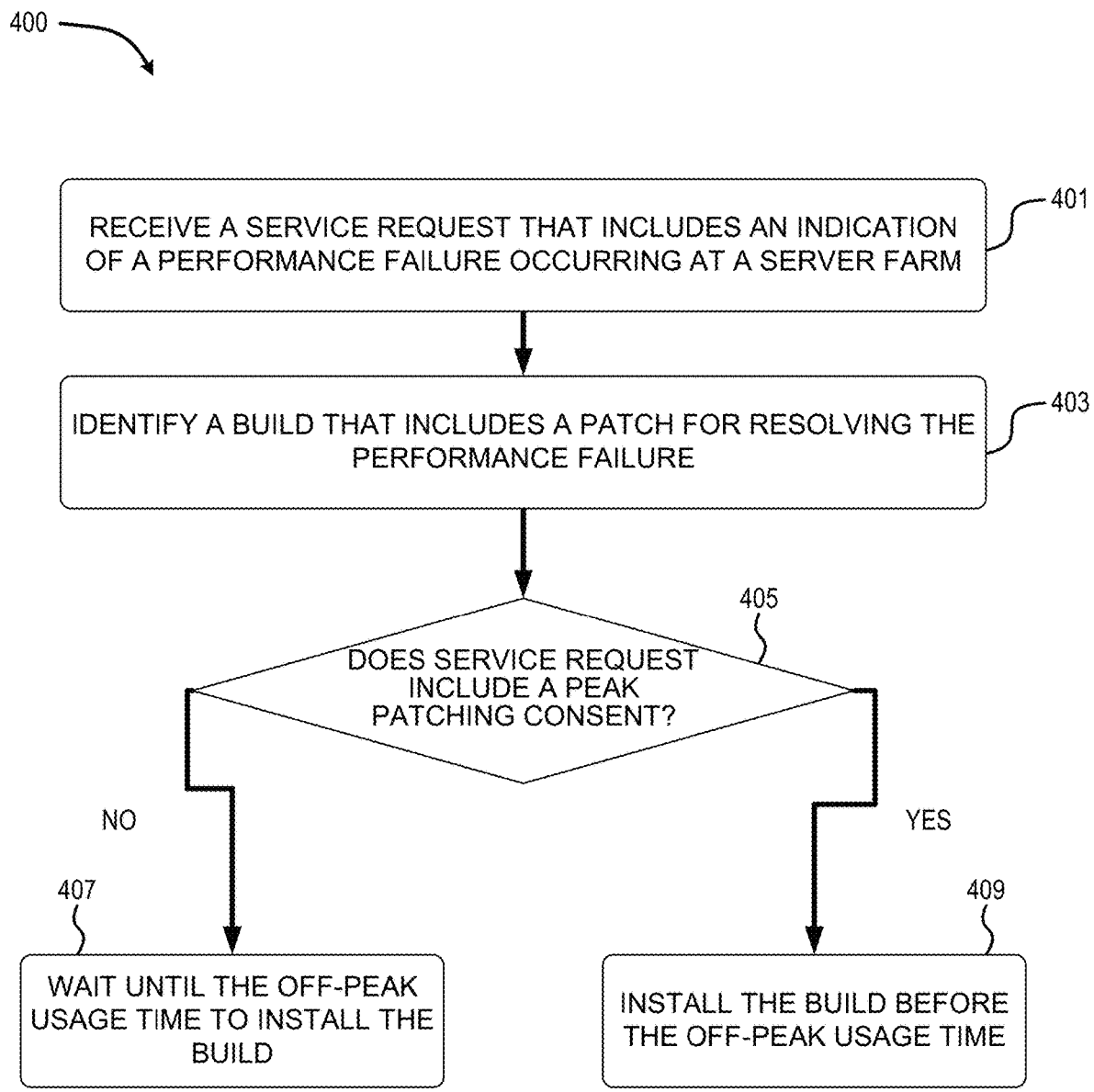
FIG. 4 illustrates a flow diagram of an example method for determining when to resolve a performance failure by installing a build on a server farm based on whether a service request that is generated by a tenant administrator provides a peak patching consent.

FIGS. 3 and 4 illustrate example flow diagrams. It should be understood by those of ordinary skill in the art that the operations of the methods disclosed herein are not necessarily presented in any particular order and that performance of some or all of the operations in an alternative order(s) is possible and is contemplated. The operations have been presented in the Turning now to FIG. 3, illustrated is a flow diagram of an example method 300 for enabling a tenant administrator 134 to generate a service request 138 that initiates a request driven peak-hour build 148 to expedite a resolution for a performance failure 130. As described above, the request driven peak-hour build 148 may include a later build than the next build in queue for a server farm 118 which obviates benefits of an intermediate build(s). Thus, by preventing installation of the intermediate build(s) onto the server farm 118 when an off-peak patching schedule 114 is overridden by the request driven peak-hour build 148, the techniques described herein reduce network traffic and processing cycles at a server farm. According to the techniques described herein, installation of such intermediate builds may be prevented in order to conserve computing resources.

At block 301, a server farm patching system 102 may receive build data 108 that defines a sequence of builds that are designed for sequential installation on a server farm 118. Individual builds within the sequence of builds may be generated via a build engine 106 to include incremental additions as compared to previous builds within the sequence of builds. For example, as issues are discovered with code of a server application and/or as it becomes desirable to add/modify features of the server application, a developer 136 may design corresponding patches. Then, the developer 136 may add these patches to a "latest" build to generate a new build—which upon being generated becomes the "latest" build.

At block 303, the server farm patching system 102 may determine an off-peak patching schedule 114 that defines a scheduled time to install a "particular" build on the server farm. The "particular" build may be the next build in the sequence after a last installed build. For example, if the last installed build was a build "B1," then the "particular" build may be build "B2"—assuming the builds are ordered "B1," and then "B2," and then "B3," and so on.

At block 305, the server farm patching system 102 may receive a service request 138 that is indicative of a performance failure 130 occurring on the server farm 118. In this example, the service request 138 is generated by the tenant administrator 134 and received by the server farm patching system 102 during a peak usage time-range (e.g., between the hours of 7:00 AM and 8:00 PM, or any other suitable time-range). With respect to a cause of the performance failure 130, presume that during the last off-peak usage time-range prior to the performance failure 130 occurring, the server farm patching system 102 had caused a build to be installed on the server farm 118. Further presume that this build included a patch that is inadvertently flawed and causes a software regression to occur with respect to some aspect of a server application 120 being run by the server farm 118. Moreover, this software regression may cause the aspect of the server application to fail altogether or, at best, continue to operate while demanding increased computing resources such as memory and/or processor cycles.

At block 307, the server farm patching system 102 may identify an "other" build that includes a patch that is designed to resolve the performance failure 130. In various instances, the patch may be non-existent at the time the indication of the performance failure 130 is initially received. For example, as software regressions may remain unbeknownst to the responsible developer(s) until they are experienced by end users, the development of a patches to resolve such software regressions may be a reactionary exercise.

At block 309, the server farm patching system 102 may override the off-peak patching schedule 114 that was previously determined at block 303 in order to trigger an out-of-sequence installation of the "other" build that includes the patch for resolving the performance failure 130. For example, the "other" build may be transmitted to the server farm 118 as a request driven peak-hour build 148 during the same peak usage time-range in which the service request 138 was received at block 305. Then, an installation process for installing the "other" build may be initiated and completed during the same peak usage time-range in which the service request 138 was received at block 305. In this way, the "other" build may be installed prior to the scheduled time that was previously set for the "particular" build based on the off-peak patching schedule 114. Therefore, despite the scheduled time for installing the next build in queue being set within an off-peak usage time-range, the "other" build may be installed prior to the end of the peak business hours during which the performance failure 130 occurred.

At block 311, the server farm patching system 102 may identify one or more intermediate builds that are ordered subsequent to a last installed build and prior to the "other" build that resolves the performance failure 130. Then, the server farm patching system 102 may prevent the one or more intermediate builds from being installed on and/or even transmitted to the server farm 118. In this way, the processing cycles that would inherently result from transmitting the intermediate builds, writing the intermediate builds to the memory of the server farm 118, and/or executing an installation of the intermediate builds at the server farm 118 can be avoided, in whole or in part.

Turning now to FIG. 4, illustrated is a flow diagram of an example method 400 for determining when to resolve a performance failure 130 by installing a build on a server farm 118 based on whether a service request 138 that is generated by a tenant administrator 138 provides a peak patching consent 146.

At block 401, the server farm patching system 102 may receive a service request 148 that includes an indication of a performance failure 130 occurring at a server farm 118. For example, a tenant administrator 134 may become aware that information workers are having their workflows disrupted by the performance failure as they are attempting to access functionality of the server application 120.

At block 403, the server farm patching system 102 may identify a build that includes a patch for resolving the performance failure 130. For example, as described with respect to FIG. 2, a flag 204 may be used to indicate which patch and/or build is designed to resolve a performance failure 130 that a particular server farm 118 and/or tenant 122 thereof has been affected by.

At block 405, the server farm patching system 102 may analyze the service request 138 to determine whether a peak patching consent 146 is included. As used herein, the term "peak patching consent" refers generally to an indication that is provided by a tenant administrator and that indicates a permission and/or consent to initiate an installation of a build process that resolve a particular performance failure 130 during a peak usage time-range.

Then, if the peak patching consent 146 is not provided within the service request 138, the method 400 may proceed to block 407 at which the build is installed only once the present time reaches the off-peak usage time and/or when the activity level falls below a threshold activity level. That is, the server farm patching system 102 may adhere to the off-peak patching schedule 114 if the tenant administrator 134 does not consent to a patch being installed during peak business hours.

Alternatively, if the peak patching consent 146 is provided within the service request 138, the method 400 may proceed to block 409 at which the build is installed prior to the off-peak usage time. That is, the server farm patching system 102 may deviate from the off-peak patching schedule 114 to perform the install process during business hours if the tenant administrator 134 does consent to a patch being installed during peak business hours.

Figure 5:
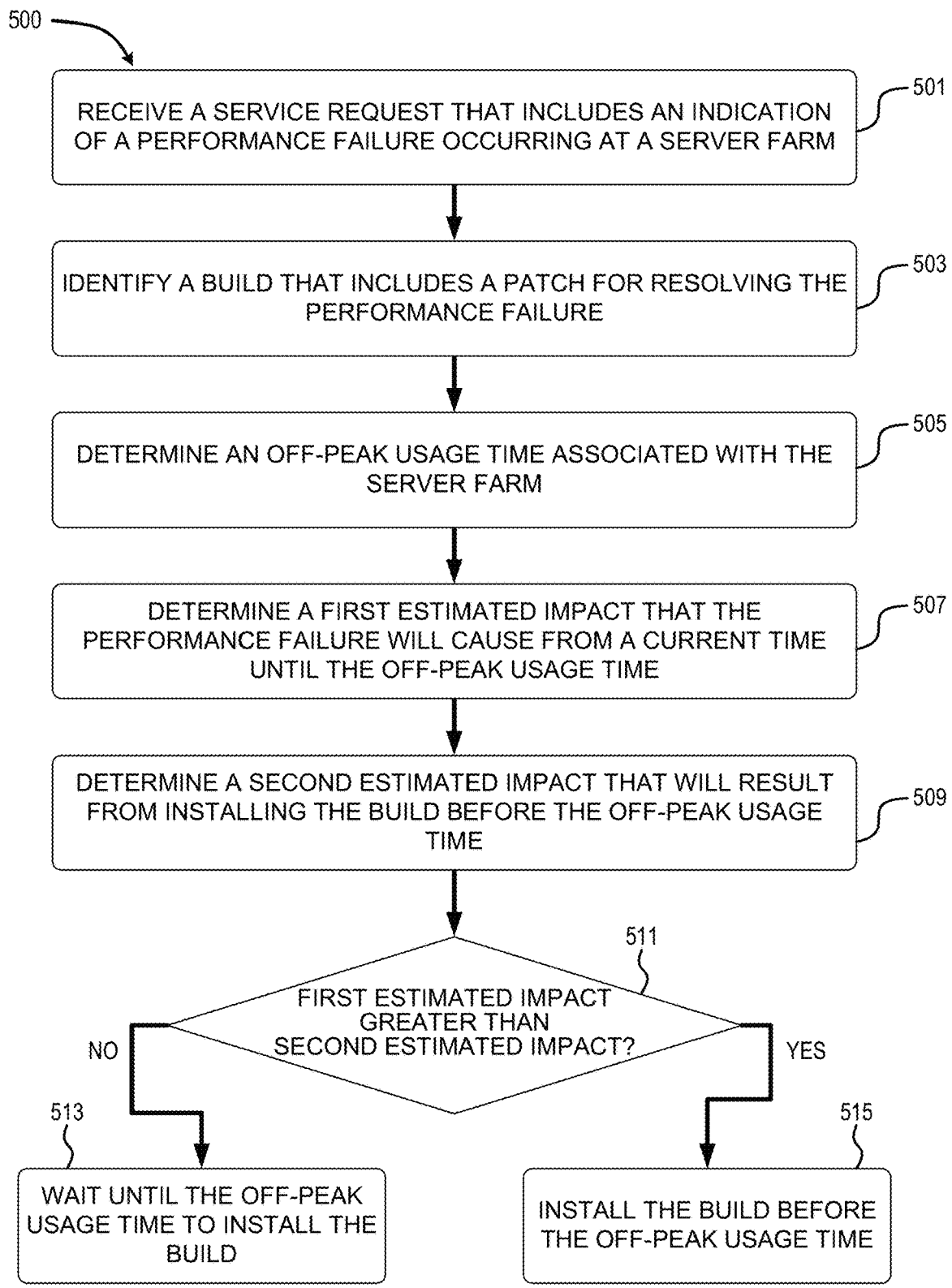
FIG. 5 illustrates a flow diagram of an example method for minimizing an impact of resolving a performance failure at a server farm by selecting when to install a build that resolves the performance failure based on a relative impact of installing the build at different times.

Turning now to FIG. 5, illustrated is a flow diagram of an example method 500 for minimizing an impact of resolving a performance failure 130 at a server farm 118 by selecting when to install a build that resolves the performance failure 130 based on a relative impact of installing the build at different times. Stated plainly, if resolving the performance failure 130 before an off-peak usage time would cause less overall disruption to end users than waiting until the off-peak usage time, then the resolution can be expedited notwithstanding the disruption caused by a system update process.

At block 501, the server farm patching system 102 may receive a service request 148 that includes an indication of a performance failure 130 occurring at a server farm 118.

At block 503, the server farm patching system 102 may identify a build that includes a patch for resolving the performance failure 130.

At block 505, the server farm patching system 102 may determine an off-peak usage time associated with the server farm 118. For example, as described with relation to FIGS. 1 and 2, the server farm patching system 102 may determine when activity 122 between the server farm 118 and the client sites 126 is at a relatively low level (e.g., as compared to peak-hours).

At block 507, the server farm patching system 102 may determine a first estimated impact that the performance failure will cause if allowed to continue from the current time until the off-peak usage time. For example, if the current time is early in the morning and the off-peak usage time is several hours away, then the first estimated impact will be greater than if the current time is late in the evening and the off-peak usage time is only minutes away. Furthermore, if the frequency with which the activity 124 results in the performance failure 130 is great, then the first estimated impact will be greater than if the activity rarely triggers the performance failure. For example, if the performance failure corresponds to some rarely invoked and obscure feature becoming non-functional, the first estimated impact may be less than if the performance failure corresponds to a feature that is frequently used to perform core job functionalities (e.g., email).

At block 509, the server farm patching system 102 may determine a second estimated impact that will likely result from installing the build that resolves the performance failure before the off-peak usage time (e.g., immediately and/or at some other time during peak business hours). For example, the server farm patching system 102 may estimate that an installation of the build may take 15 minutes and be completed prior to the levels of activity 124 ramping up for the day (e.g., it may be the very beginning of a work day when few employees have arrived to work).

At block 511, the server farm patching system 102 may determine an estimated relative impact by determining whether the first estimated impact is greater than the second estimated impact. Stated alternatively, the server farm patching system 102 determines whether it would be more disruptive to fix the performance failure before the off-peak usage time or, alternatively, to wait.

Then, if the first estimated impact is less than the second estimated impact, the method 500 may proceed to block 513 at which the build is installed only once the present time reaches the off-peak usage time. That is, the server farm patching system 102 may adhere to the off-peak patching schedule 114 if doing so would be less disruptive than performing an install process during business hours.

Alternatively, if the first estimated impact is greater than the second estimated impact, the method 500 may proceed to block 515 at which the build is installed prior to the off-peak usage time. That is, the server farm patching system 102 may deviate from the off-peak patching schedule 114 to perform the install process during business hours if doing so would be less disruptive than waiting until off-peak business hours.

Figure 6:
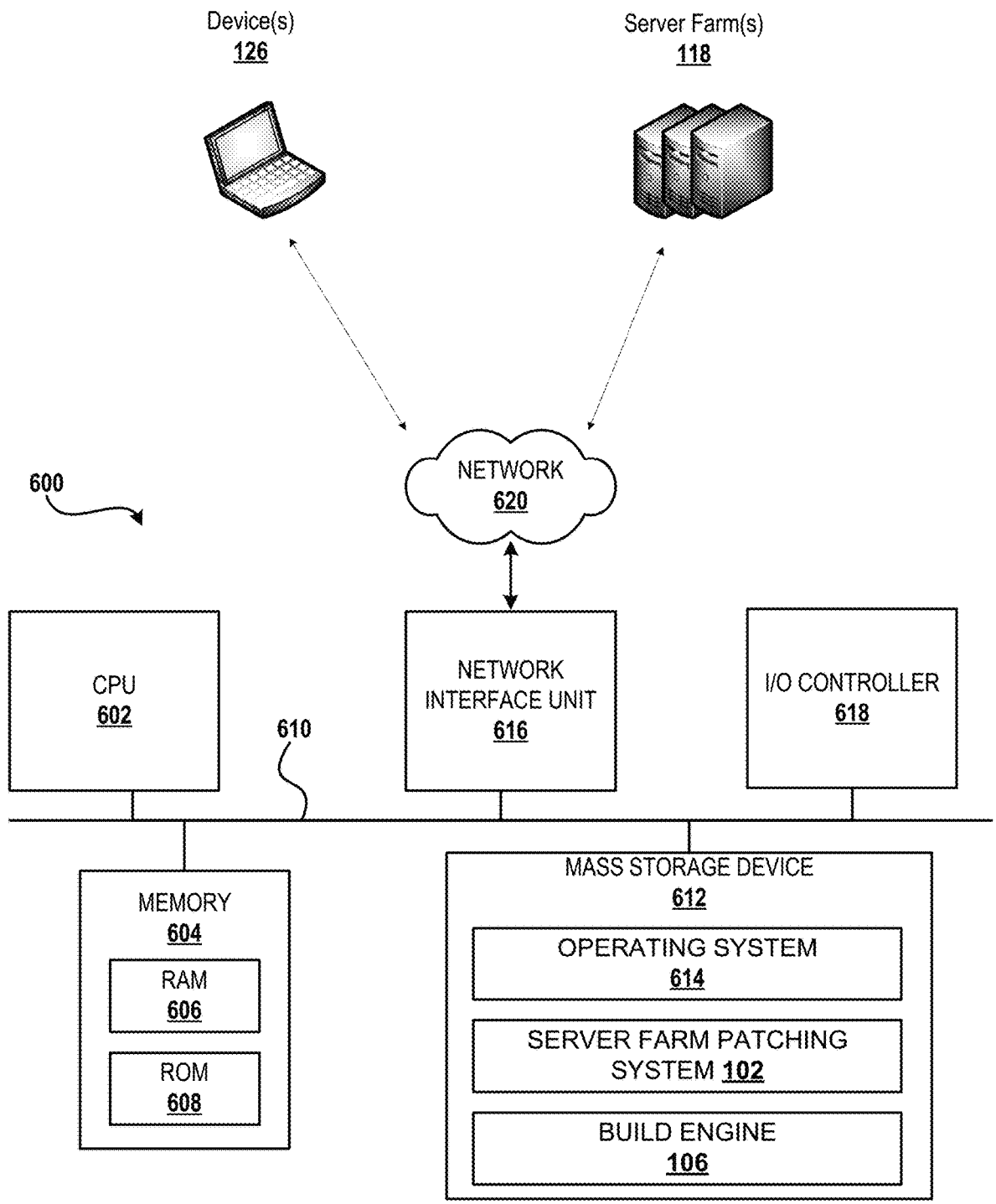
FIG. 6 shows additional details of an example computer architecture for a computer capable of executing the techniques disclosed herein.

FIG. 6 shows additional details of an example computer architecture for a computer capable of executing the techniques disclosed herein. Thus, the computer architecture 600 illustrated in FIG. 6 illustrates an architecture for a client device, a server computer, or network of server computers, or any other types of computing devices suitable for implementing the functionality described herein. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more of the server farm patching system 102 and/or the build engine 106.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various techniques, the computer architecture 600 may operate in a networked environment using logical connections to remote computers through a network 620 and/or another network (not shown). The computer architecture 600 may connect to the network 620 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that via a connection to the network 620 through a network interface unit 616, the computing architecture may enable the server farm patching system 102 and/or the build engine 106 to communicate with one or more of the device(s) 126 and/or the server farms 118.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

The disclosure presented herein may be considered in view of the following clauses.

EXAMPLE CLAUSES

Example Clause A, a system for enabling tenant administrators to initiate request driven peak-hour builds, the system comprising: one or more processors; a memory in communication with the one or more processors, the memory having computer-readable instructions stored thereupon which, when executed by the one or more processors, cause the one or more processors to: determine a patching schedule that defines one or more off-peak usage times for installing a sequence of builds on a plurality of server farms, wherein individual builds include one or more patches that are designed to modify a server application that is being executed by the plurality of server farms in association with a plurality of tenants; receive, during a peak usage time-range, a service request that is indicative of a performance failure of the server application occurring in association with a particular tenant on a particular server farm, wherein the service request includes incident data that defines one or more characteristics of the performance failure; identify, based on the incident data, an individual build of the sequence of builds that includes a particular patch that is designed to resolve the performance failure, wherein the individual build is non-sequential with another build that was last installed on the particular server farm; and in response to the service request, transmit the individual build to the particular server farm as a request driven peak-hours build to override the patching schedule with an out-of-sequence installation of the individual build.

Example Clause B, the system of Example Clause A, wherein the computer-readable instructions further cause the one or more processors to cause a service request portal to display at least one user interface (UI) element that enables a tenant administrator to define a severity indicator in association with the performance failure; and wherein the request driven peak-hours build is transmitted based on the severity indicator exceeding a threshold severity level.

Example Clause C, the system of any one of Example Clauses A through B, wherein the service request includes a peak-hour patching consent that corresponds to the particular tenant, and wherein the overriding the patching schedule is in response to the service request including the peak-hour patching consent.

Example Clause D, the system of any one of Example Clauses A through C, wherein the computer-readable instructions further cause the one or more processors to: determine an estimated relative impact associated with overriding the patching schedule to resolve the performance failure prior to a particular off-peak usage time for the particular server farm; and cause a service request portal to communicate the estimated relative impact to a tenant administrator for the particular tenant.

Example Clause E, the system of any one of Example Clauses A through D, wherein the computer-readable instructions further cause the one or more processors to: generate an incident identifier (ID) based on the service request; identify a plurality of other service requests that include other incident data that also defines the one or more characteristics; associate the incident ID with a subset of the plurality of server farms that correspond to the plurality of other service requests; and in response to the individual build becoming available for deployment, transmit to the subset a plurality of request driven peak-hour builds.

Example Clause F, the system of any one of Example Clauses A through E, wherein the computer-readable instructions further cause the one or more processors to: identify one or more intermediate builds that are ordered after the other build and prior to the individual build within the sequence of builds; and prevent installation of the one or more intermediate builds on the particular server farm.

Example Clause G, the system of Example Clause F, wherein preventing installation of the one or more intermediate builds on the particular server farm includes preventing transmission of the one or more intermediate builds to the particular server farm.

Example Clause H, the system of any one of Example Clauses A through G, wherein successive builds within the sequence of builds include incremental additions to the plurality of patches.

Example Clause I, a computer-implemented method, comprising: receiving build data defining a sequence of builds for installation on a server farm, wherein individual builds of the sequence of builds include one or more patches for modifying a server application; determining a patching schedule for installing a second build on the server farm subsequent to a first build being installed on the server farm, the patching schedule to trigger build installations outside of a peak usage time-range for a tenant of the server farm; receiving, during the peak usage time-range, a service request that is indicative of a performance failure of the server application occurring in association with the tenant, wherein the service request indicates a peak patching consent of a tenant administrator of the tenant, and wherein the service request indicates one or more characteristics of the performance failure; based on the one or more characteristics of the performance failure, identifying a third build that includes a particular patch that is designed to resolve the performance failure; and in response to the peak patching consent, transmitting a request driven peak-hours build to the server farm during the peak usage time-range, wherein the request driven peak-hours build to overrides the patching schedule by triggering an out-of-sequence installation of the third build.

Example Clause J, the computer-implemented method of Example Clause I, wherein the service request includes a severity indicator that is defined by the tenant administrator corresponding to the tenant.

Example Clause K, the computer-implemented method of Example Clause J, wherein the out-of-sequence installation of the third build is initiated during the peak usage time-range based on a determination that the severity indicator is above a threshold severity level.

Example Clause L, the computer-implemented method of Example Clause J, wherein the patching schedule defines a threshold activity level to prevent build installations from being triggered when an activity level between one or more tenants and the server farm is above the threshold activity level, and wherein, based on the severity indicator, the out-of-sequence installation of the third build is initiated during the peak usage time-range when the activity level between one or more tenants and the server farm is above the threshold activity level. Example Clause M, the computer-implemented method of any one of Example Clauses I through L, further comprising preventing transmission of the second build to the server farm based on the out-of-sequence installation of the third build on the server farm.

Example Clause N, the computer-implemented method of Example Clause M, wherein the second build in an intermediate build in the sequence of builds with respect to the first build and the third build, and wherein the third build is inclusive of a set patches of the second build.

Example Clause O, the computer-implemented method of any one of Example Clauses I through N, wherein identifying the third build that includes the particular patch monitoring the build data to determine when the particular patch becomes available for deployment to the server farm.

Example Clause P, the computer-implemented method of any one of Example Clauses I through O, wherein the performance failure corresponds to a software regression associated with one or more functionalities of the server application.

Example Clause Q, a system, comprising: one or more processors; a memory in communication with the one or more processors, the memory having computer-readable instructions stored thereupon which, when executed by the one or more processors, cause the one or more processors to: receive, during a peak usage time-range, a service request that is indicative of a performance failure of a server application occurring in association with a tenant that is being facilitated by a server farm; identify an individual build of a sequence of builds that includes a particular patch that is designed to resolve the performance failure; determine whether to override an off-peak patching schedule by causing an installation of the individual build on the server farm during peak usage time-range based on at least one of: a peak patching consent that is provided by a tenant administrator in the service request, or an estimated relative impact of resolving the performance failure during the peak usage time-range relative to resolving the performance failure after the peak usage time-range; and based on a determination to override the off-peak patching schedule, transmit the individual build to the server farm as a request driven peak-hours build to override the patching schedule with an out-of-sequence installation of the individual build that occurs during the peak usage time-range.

Example Clause R, the system of Example Clause Q, wherein the computer-readable instructions further cause the one or more processors to prevent transmission of one or more intermediate builds to the server farm to reduce network traffic in association with the server farm.

Example Clause S, the system of any one of Example Clauses Q through R, wherein the estimated relative impact is determined based on a comparison between: a first estimated impact associated with the performance failure continuing throughout the peak usage time-range; and a second estimated impact associated with installing the individual build during the peak usage time-range.

Example Clause T, the system of any one of Example Clauses Q through S, wherein the performance failure corresponds to a software regression.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system, comprising:
   one or more processors;
   a memory in communication with the one or more processors, the memory having computer-readable instructions stored thereupon which, when executed by the one or more processors, cause the system to:
      determine a patching schedule that defines one or more off-peak usage times for installing builds of patches on a plurality of server farms that are executing one or more applications in association with a plurality of tenants;
      receive, during a peak usage time-range, a service request that is indicative of a performance failure occurring on a particular server farm in association with a particular tenant;
      identify, based on the service request, an individual build that includes one or more particular patches that are usable to resolve the performance failure; and
      in response to the service request, transmit the individual build to the particular server farm as a request driven peak-hours build to override the patching schedule with an installation of the individual build during the peak usage time-range.

2. The system of claim 1, wherein the individual build that is transmitted to the particular server farm is non-sequential with another build that was last installed on the particular server farm.

3. The system of claim 1, wherein the performance failure corresponds to a software regression that is a result of another build that was last installed on the particular server farm.

4. The system of claim 3, wherein the performance failure that corresponds to the software regression includes at least one of:
   a catastrophic failure of at least one computer program that is executing in association with the particular tenant, or
   an increased computing resource demand of the at least one computer program that is executing in association with the particular tenant.

5. The system of claim 1, wherein the computer-readable instructions further cause the system to:
enable a tenant administrator to define a severity indicator in association with the performance failure; and
determine whether to transmit the individual build to the particular server farm as the request driven peak-hours build based on the severity indicator.

6. The system of claim 1, wherein the service request includes a peak-hour patching consent that corresponds to the particular tenant, and wherein overriding the patching schedule with the installation of the individual build during the peak usage time-range is in response to the service request including the peak-hour patching consent.

7. The system of claim 1, wherein the computer-readable instructions further cause the system to:
determine an estimated relative impact associated with overriding the patching schedule to resolve the performance failure prior to an upcoming off-peak usage time, and wherein overriding the patching schedule with the installation of the individual build during the peak usage time-range is in response to the service request including a peak-hour patching consent.

8. The system of claim 1, wherein the builds of patches are successive builds within a sequence of builds that include incremental additions of patches.

9. A system, comprising:
one or more processors;
a memory in communication with the one or more processors, the memory having computer-readable instructions stored thereupon which, when executed by the one or more processors, cause the system to:
determine a patching schedule for installing builds of patches on a plurality of server farms during an off-peak usage time-range;
receive a service request that includes an indication of a performance failure occurring on at least one server farm in association with a particular tenant, wherein the service request is received during a peak usage time-range of the at least one server farm;
identify at least one individual build that includes one or more particular patches for resolving the performance failure;
determine whether the particular tenant has provided a peak patching consent in association with the service request; and
in response to determining that the particular tenant has provided the peak patching consent in association with the service request, causing the at least one individual build to be installed on the at least one server farm during the peak usage time-range, or
in response to determining that the particular tenant has not provided the peak patching consent in association with the service request, causing the at least one individual build to be installed on the at least one server farm during the off-peak usage time-range.

10. The system of claim 9, wherein the peak patching consent is provided during the peak usage time-range by a tenant administrator through a service request portal.

11. The system of claim 10, wherein the computer-readable instructions further cause the system to:
determine an estimated relative impact associated with overriding the patching schedule to resolve the performance failure prior to an upcoming off-peak usage time; and
communicate the estimated relative impact to the tenant administrator through the service request portal.

12. The system of claim 9, wherein the computer-readable instructions further cause the system to:
determine a first estimated impact that the performance failure will cause from a current time until an upcoming off-peak usage time;
determine a second estimated impact that will result from causing the at least one individual build to be installed on the at least one server farm during the peak usage time-range; and
compare the first estimated impact with the second estimated impact to determine an estimated relative impact associated with overriding the patching schedule to resolve the performance failure prior to the upcoming off-peak usage time.

13. The system of claim 12, wherein the first estimated impact is determined based at least in part on at least one of: a frequency associated with the performance failure, or a severity associated with the performance failure.

14. The system of claim 9, wherein the performance failure that corresponds to at least one of:
a catastrophic failure of at least one computer program that is executing in association with the particular tenant, or
an increased computing resource demand of the at least one computer program that is executing in association with the particular tenant.

15. The system of claim 9, wherein the performance failure corresponds to a software regression that is a result of another build that was last installed on the at least one server farm.

16. The system of claim 9, wherein the builds of patches are successive builds within a sequence of builds that include incremental additions of patches.

17. A computer-implemented method, comprising:
determining a patching schedule that defines one or more off-peak usage times for installing builds of patches on a plurality of server farms;
receiving a service request that is indicative of a performance failure occurring on a particular server farm in association with a particular tenant and during a peak usage time-range;
identifying an individual build that includes one or more particular patches that are usable to resolve the performance failure; and
based at least in part on the service request, transmitting the individual build to the particular server farm as a request driven peak-hours build to override the patching schedule with an installation of the individual build during the peak usage time-range.

18. The computer-implemented method of claim 17, wherein the performance failure that corresponds to a catastrophic failure of at least one computer program that is executing on the particular server farm.

19. The computer-implemented method of claim 17, wherein the performance failure that corresponds to an increased computing resource demand of at least one computer program that is executing on the particular server farm.

20. The computer-implemented method of claim 17, wherein the performance failure corresponds to a software regression.

* * * * *